(12) United States Patent
Bonhoure et al.

(10) Patent No.: US 11,103,938 B2
(45) Date of Patent: Aug. 31, 2021

(54) INDEXABLE CUTTING INSERT FOR A MILLING TOOL

(71) Applicant: SANDVIK INTELLECTUAL PROPERTY AB, Sandviken (SE)

(72) Inventors: David Bonhoure, Luynes (FR); Marc Rue, Charentilly (FR); Jean-Philippe Bruneau, Tours (FR)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 137 days.

(21) Appl. No.: 16/478,575

(22) PCT Filed: Sep. 20, 2017

(86) PCT No.: PCT/EP2017/073756
§ 371 (c)(1),
(2) Date: Jul. 17, 2019

(87) PCT Pub. No.: WO2018/133958
PCT Pub. Date: Jul. 26, 2018

(65) Prior Publication Data
US 2019/0344363 A1 Nov. 14, 2019

(30) Foreign Application Priority Data

Jan. 18, 2017 (EP) .................................... 17152047

(51) Int. Cl.
*B23C 5/06* (2006.01)
*B23C 5/22* (2006.01)
(52) U.S. Cl.
CPC .............. *B23C 5/06* (2013.01); *B23C 5/2221* (2013.01); *B23C 2200/045* (2013.01);
(Continued)

(58) Field of Classification Search
CPC ........ B23C 2200/161; B23C 2200/128; B23C 2200/045; B23C 2200/365; B23C 5/2468;
(Continued)

(56) References Cited

U.S. PATENT DOCUMENTS

| 2010/0054873 A1* | 3/2010 | Men ........................ B23C 5/202 407/42 |
| 2011/0150586 A1 | 6/2011 | Fang et al. |

(Continued)

FOREIGN PATENT DOCUMENTS

| DE | 112015003342 T5 | 4/2017 |
| EP | 1629917 A1 | 3/2006 |

(Continued)

*Primary Examiner* — Nicole N Ramos
(74) *Attorney, Agent, or Firm* — Corinne R. Gorski

(57) ABSTRACT

An indexable and double-sided round cutting insert includes an upper and lower side. A center axis extends between the upper and lower side and a median plane extends perpendicular to the center axis and is situated halfway between the upper and lower side. A side surface has an upper and lower positive clearance surface at an upper positive clearance angle with respect to an upper cutting edge and a lower positive clearance angle with respect to a lower cutting edge. A plurality of protrusions extends along the side surface and protrude in a radial direction perpendicular to the center axis. Each protrusion includes an outer surface, which along the center axis, extends such that a first radial distance from the center axis to the outer surface in the median plane is at least equal to or greater than a second radial distance from the center axis to the outer surface.

15 Claims, 3 Drawing Sheets

(52) U.S. Cl.
CPC .. *B23C 2200/121* (2013.01); *B23C 2200/286* (2013.01); *B23C 2210/168* (2013.01)

(58) Field of Classification Search
CPC ... B23C 5/2465; B23C 5/2221; B23C 5/2247; B23C 5/06; B23C 2210/168
See application file for complete search history.

(56) References Cited

U.S. PATENT DOCUMENTS

| | | | |
|---|---|---|---|
| 2012/0070239 A1* | 3/2012 | Park | B23C 5/06 |
| | | | 407/42 |
| 2012/0076596 A1* | 3/2012 | Kim | B23C 5/202 |
| | | | 407/69 |
| 2017/0259356 A1* | 9/2017 | Lee | B23C 5/2221 |
| 2018/0147642 A1* | 5/2018 | Takahashi | B23C 5/2221 |

FOREIGN PATENT DOCUMENTS

| | | | |
|---|---|---|---|
| EP | 2614910 A | | 7/2013 |
| JP | 2011245585 A | | 12/2011 |
| JP | 2015024458 A2 | | 2/2015 |
| KR | 101556737 B1 | | 10/2015 |
| WO | 2010134700 A2 | | 11/2010 |
| WO | 2016027998 A1 | | 2/2016 |
| WO | 2017002596 A1 | | 1/2017 |

\* cited by examiner

INDEXABLE CUTTING INSERT FOR A MILLING TOOL

RELATED APPLICATION DATA

This application is a § 371 National Stage Application of PCT International Application No. PCT/EP2017/073756 filed Sep. 20, 2017 claiming priority to EP 17152047.1 filed Jan. 18, 2017.

FIELD OF THE INVENTION

The present invention generally relates to a cutting insert for a milling tool. In particular, the present invention relates to an indexable, round double sided cutting insert for a milling tool and a milling tool comprising such an insert.

TECHNICAL BACKGROUND

In the field of milling, it is known to provide a rotating milling tool with replaceable and indexable cutting inserts arranged along the periphery of the milling tool body, wherein each cutting insert comprises a number of indexable cutting edges arranged along at least an upper side of the cutting insert. It is also known to provide a double sided cutting insert having indexable cutting edges also along a lower side of the cutting insert in order to achieve a twofold increase of the indexable cutting edges.

Such indexable cutting inserts may, depending on the shape of the cutting insert, assume a number of predetermined index positions with respect to an insert seat provided on the tool body and thereby allow the user to utilize all of the indexable cutting edges before replacing the cutting insert. For example, a square shaped cutting insert may comprise four indexable cutting edges which are utilized by means of a 90 degree indexation or rotation of the cutting insert with respect to the seat.

In for example profile milling applications or face milling applications it is known to utilize round cutting inserts having a round cutting edge extending along the periphery of the cutting insert.

However, in contrast to for example the square shaped cutting insert mentioned above as well as polygonally shaped inserts in general which commonly utilize their side surfaces (also referred to as clearance surfaces) to rotationally lock the insert in the seat in the different index positions, additional elements to rotationally lock the round cutting insert in the seat are often provided.

Various solutions have therefore been proposed to introduce different types of locking means on such round cutting inserts. For example, EP 2 614 910 A1 by the applicant of the present invention, discloses a cutting insert provided with rotationally securing locking means in the chip faces. Another example is provided by EP 1 629 917 A1, also by the applicant of the present invention, disclosing a cutting insert having facets cooperating with corresponding surfaces in the insert seat to provide a rotational lock.

However, such round cutting inserts also tend to be associated with problems such as a limited number of index positions involving a rather large rotation in the indexation of the cutting insert and/or an insufficient stability in the rotational lock of the cutting insert that further involve requirements on close tolerances that add complexity to the manufacturing of the cutting insert. Hence, if for instance the desired depth of cut is relatively small, it would be beneficial to only rotate or index the round cutting insert in small steps in order to more efficiently use the entire cutting edge and thereby increase the service life even further. In other words, it would be advantageous if the round cutting insert could be rotated by only a small amount and thereby provide a large number of index positions (i.e. "cutting edge portions") to be utilized before the round cutting insert has to be replaced.

In order to solve some of these problems, it is also known to provide a clearance surface of the round cutting insert with protruding elements, or bosses, adapted to mate with corresponding depressions in the insert seat to rotationally lock and index the round cutting insert. One example of such a cutting insert, in this case a single sided cutting insert, is the round cutting insert marketed under the name Coro-Mill® 300 by the applicant of the present invention.

However, there is a desire to further improve the machining efficiency/service life and stability in locking/supporting the round cutting insert.

SUMMARY OF THE INVENTION

Accordingly, it is an object of the present invention to provide an indexable round cutting insert improving the machining efficiency by providing a plurality of rotational or index positions. In particular, it is an object to provide such a round cutting insert with improved stability and efficiency in rotationally locking the round cutting insert compared to the prior art. These objects are achieved by an indexable and double-sided round cutting insert, a cutting tool and a tool body as defined in the independent claims. Preferred embodiments are defined in the dependent claims.

According to one aspect of the invention, an indexable and double-sided round cutting insert for a milling tool is provided. The cutting insert comprises an upper side having an upper flat support surface, a lower side having a lower flat support surface, wherein a center axis of the round cutting insert extends between the upper and lower side, and a median plane is extending perpendicular to said center axis and situated halfway between the upper and lower side. A side surface is extending between the upper and lower side, wherein an upper cutting edge is formed between the upper side and the side surface and a lower cutting edge is formed between the lower side and the side surface. The side surface comprises an upper and a lower positive clearance surface such that the upper positive clearance surface has a substantially frusto-conical extension at an upper positive clearance angle α with respect to the upper cutting edge and the lower positive clearance surface has a substantially frusto-conical extension at a lower positive clearance angle β with respect to the lower cutting edge, and a plurality of protrusions extending along the side surface and protruding in a radial direction perpendicular to the center axis of the round cutting insert. Each of the plurality of protrusions comprises an outer surface, which in a direction along the center axis is extending such that a first radial distance from the center axis to the outer surface in the median plane of the insert is at least equal to or greater than a second radial distance from the center axis to the outer surface in parallel planes located closer to the upper or lower side of the cutting insert.

According to the first aspect, the cutting insert provides an inventive solution to the objects described above derived from the realization that the desired characteristics may be provided on a double-sided round cutting insert by a design of a side surface of the round cutting insert comprising an inventive combination of double positive clearance surfaces and a plurality of protrusions having an outer surface extending such that the first radial distance from the center axis to the outer surface in the median plane of said insert is the same or larger than the second radial distances from the axis to the outer surface in the extension closer to the upper or lower side of the cutting insert. Hereby, the cutting insert provides a cost efficient and flexible indexation of upper and lower cutting edges by means of an advantageously large number of possible rotation or index positions, depending on the large number of protrusions that can be provided due to their relatively limited extension in the circumferential direction of the round cutting insert, while at the same time providing an improved rotational stability by said protrusions having a relatively large radial extension or height at the median plane.

In other words, due to the increase of height of the protrusions, particularly at the median plane, which is effected by the combined extension of the outer surface (for example in parallel with the center axis or extending along said center axis in a convex manner) of the protrusion and the angled extension of the respective positive clearance surfaces comprised by the side surface allowing for a larger height, i.e. a larger difference in height between protrusions and adjacent portions of the clearance surfaces, that provide a more positive locking engagement with corresponding depressions in the insert seat. Accordingly, the inventive combination of features among other advantages allow for an increase of relative height of the protrusions and therefore an improved rotational stability compared to the prior art. Additionally, the double positive clearance surfaces provide an improved ramping capacity in a milling operation, and further so called helical interpolation.

With regards to the detailed design options for the clearance surfaces, many variations are conceivable within the scope of the present specification. For example, in some embodiments, the upper positive clearance angle α and the lower positive clearance angle β may be substantially equal, whereas in other embodiments the angles α and β may be different.

However, in the most practical embodiments, the double-sided round cutting insert is generally symmetric in that the upper and lower sides and cutting edges are identical, wherein the angles α and β are equal and further in that the height along the axis A of the upper and lower clearance surfaces is the same. Asymmetric designs are however conceivable within the scope of the present invention.

Further, at least a portion of the upper and lower positive clearance surface respectively may advantageously provide additional radial and axial support when arranged on a milling tool, by means of resting against a corresponding surface of an insert seat of the milling tool. In some embodiments however, the support may be provided by the protrusions alone.

Similarly, some of the possible variations with regards to the protrusions include that in some embodiments, the relative height of all protrusions with respect to adjacent portions of the clearance surfaces is the same. In other embodiments however, the height of at least one protrusion differs from the height of the other protrusions. Further, in some embodiments, the position and/or plane defining the maximum height of the protrusions coincide with a position and/or plane defining the minimum radius of the clearance surfaces. This position is typically located at the median plane of the cutting insert of said embodiments.

According to one embodiment, the outer surface of a cross-section of each of said plurality of protrusions comprises a convex shape, such as a semi-circular or semi-elliptical shape. Such a shape is advantageous in that a large area of contact perpendicular to direction of rotation may be achieved, hereby improving stability of the insert. Any other shape such as for example triangular or square shapes are however also conceivable within the scope of the present invention.

According to one embodiment, the side surface further comprises an intermediate portion extending between said upper and lower positive clearance surfaces, the intermediate portion being countersunk in relation to the upper and lower positive clearance surfaces, such that a maximum diameter of said countersunk intermediate portion is smaller than a minimum diameter of said upper and lower positive clearance surfaces, each of said plurality of protrusions being interposed between said upper and lower positive clearance surfaces to only extend along said countersunk intermediate portion of said side surface.

In this embodiment each of the protrusions extend along the countersunk intermediate portion, wherein an axial and/or radial side support can be provided by the clearance surfaces extending above (and below) the protrusions. A design is hereby achieved wherein the protrusion are separated from the side support surfaces, in this case formed by the upper and lower positive clearance surfaces.

Further, in such an embodiment, the intermediate portion may have a relatively large extension in the axial direction A of the cutting insert. Further, the axial extension of the clearance surface may also be relatively large in order to provide sufficient axial/radial support.

Such an arrangement having the protrusion extending separate from the positive clearance surface is advantageous in that for example grinding of the clearance surfaces into a more precise shape (and/or other similar operations) is facilitated, since the protrusions do not prevent the grinding operation due to them not interfering with the clearance surfaces. In the case that the clearance surfaces form support faces, such a design can also improve the stability of the cutting insert in terms of axial/radial side support.

According to one embodiment, the upper and lower positive clearance surfaces intersect at a median plane to form a waist of said cutting insert, wherein each of said plurality of protrusions extend between said upper and lower positive clearance surfaces over said waist.

According to one embodiment, each of the upper and lower clearance surface comprises at least a primary clearance surface and a secondary clearance surface, wherein the primary clearance surface is formed between the cutting edge and the secondary clearance surface, and wherein each of said plurality of protrusions extend between the secondary clearance surfaces of the upper and lower clearance surfaces, said primary clearance surface forming a primary clearance angle γ and said secondary clearance surface forming a secondary clearance angle θ with a plane defined by the upper or lower cutting edge, the secondary clearance angle θ being larger than the primary clearance angle γ.

The embodiment does not however exclude that the upper and lower clearance surfaces comprises even further clearance surfaces, i.e. for example a primary clearance surface, a secondary clearance surface and a third clearance surface respectively.

Such a plurality of clearance surface portions, particularly a primary clearance surface, is advantageous for example in that grinding of the primary clearance surface and the cutting edges is facilitated. For example, it may be desirable to grind the primary clearance surfaces below the cutting edge to improve precision and sharpness of the cutting edge. The primary clearance angle is hereby smaller than the secondary clearance angle to make grinding easier.

For example, in the case that each of the protrusions extends between the secondary clearance surfaces of the upper and lower clearance surfaces, the protrusions extend along the secondary clearance surfaces which in turn can form additional axial/radial support surfaces for the cutting insert. In such an embodiment, the upper and lower secondary clearance surfaces may preferably meet at a median plane of the cutting insert to form a waist of said cutting insert, wherein each protrusion extends between the upper and lower secondary clearance surfaces to form a largest height over the waist. In other words, this provides a symmetric cutting insert having upper and lower clearance surfaces forming an axial/radial support, while the height on the protrusions increases toward the waist at the median plane to securely counteract rotational movement of the cutting insert in the seat.

According to one embodiment, the upper and lower cutting edge, respectively, is situated further from the median plane through the insert compared to said upper and lower flat support surface respectively. This provides raised cutting edges having a positive rake angle inside the cutting edge for smooth chip breaking compared to lower cutting edges that require concave chip forming/breaking surfaces configured inside the cutting edge. In this way it is also possible to provide relatively larger upper/lower flat support surfaces on the cutting insert, since such concave chip breaking surfaces also limit the size of the upper/lower flat support surfaces of the insert, in particular at the periphery of the cutting insert (in proximity to the lower inactive cutting edge) where a secure bottom support for the cutting insert is desired in supporting the cutting forces acting on the upper active cutting edge.

According to a second aspect of the invention, a cutting tool configured for milling is provided. The cutting tool comprising a tool body being rotatable around an axis of rotation and a cutting insert according to any of the embodiments described in the foregoing. The tool body comprises at least one insert seat adapted to receive the cutting insert, the at least one insert seat comprising a flat bottom support surface adapted to support the lower flat support surface of the cutting insert, and an insert seat side surface comprising a plurality of depression, each depression being adapted to receive one of the plurality of protrusions extending along the side surface of the cutting insert, the double-sided cutting insert being removably attached to the insert seat such that the upper or the lower flat support surface of the cutting insert is supported against the flat bottom support surface of the insert seat, while the protrusions on the cutting insert are received in the depressions in the insert seat side surface.

Accordingly, the cutting insert is supported by the insert seat by means of the flat bottom surface and the depressions in the seat receiving the protrusions of the cutting insert, thereby achieving a stable rotational lock and efficient indexation of the cutting insert. The depressions may be designed such that in a mounting of the cutting insert in the seat a small gap is present between the protrusion of the insert and the depression for facilitating a mounting of the protrusions of the cutting insert into the depressions of the seat. For example, the depressions may have a wider opening or asymmetric shape compared to the protrusion to facilitate the mounting of the protrusions into the depressions of the seat. This gap has however no effect after the mounting of the cutting insert as well as during the milling operation such that that said stable support and rotational locking is provided.

According to one embodiment, each of the plurality of depressions comprises an inner surface extending such that a first radial seat distance from said center axis of said cutting insert when mounted to said insert seat to said inner surface in the median plane of said insert is at least equal to or greater than a second radial seat distance from said center axis to said inner surface in parallel planes located closer to said upper and/or lower side of said cutting insert. This provides corresponding axial extensions on the inner surfaces of the depressions as the outer surfaces of the protrusions, whereby a stable surface contact between the protrusion and depressions can be achieved, while reducing or preventing high stresses and/or possible deformation of the depressions in the seat.

According to one embodiment, each of the plurality of depressions comprises an inner surface extending in parallel to a direction of the axis of the cutting insert when mounted to the insert seat. However, each of the plurality of depressions may alternatively comprise an inner surface extending in a concave manner along the axis of the cutting insert when mounted to the insert seat. Hence, the axial extension on the inner surface of the depression may hereby be adapted to the axial extension on the outer surface of the protrusion on the cutting insert.

According to one embodiment, the depressions are evenly spaced at a first angle defining the distance between adjacent depressions of said insert seat and the protrusions are evenly spaced at a second angle defining the distance between adjacent protrusions of said cutting insert, the second angle being a multiple of the first angle, whereby the insert seat is formed with at least one intermediate depression located between adjacent protrusions when said cutting insert is mounted to the insert seat. This is advantageous in that a larger number of indexable positions can be provided for the cutting insert. The multiple may be an integer multiple, for example two, i.e. such that the second angle is twice as large as the first angle, wherein the number of indexable position is increased by two to double the number of possible positions for the cutting insert and reduce the possible indexation into relatively smaller steps.

In other embodiments, the depressions are evenly spaced at a first angle defining the distance between adjacent depressions of said insert seat and the protrusions are evenly spaced at a second angle defining the distance between adjacent protrusions of said cutting insert, the second angle being equal to the first angle.

According to one embodiment, the insert seat side surface further comprises an insert seat side support surface arranged to support at least a portion of said upper positive clearance surface of said cutting insert being received in the insert seat, the lower positive clearance surface obviously becoming the upper clearance surface when the double-sided insert is turned over This is advantageous in that the cutting inserts may be even more firmly supported by the insert seat, especially with regards to a radial and axial support. Such a seat side support surface may have a similar, or identical, frusto-conical extension as the first and second conical clearance surfaces, especially with regard to the angles of inclination a and R. In other embodiments however, the support may be provided by solely the depressions and the flat bottom surface of the seat.

According to one embodiment, the plurality of depressions are provided on a rim and the seat side support surface is a separate seat side support surface arranged at a larger distance from the bottom support surface compared to the rim. In other words, the seat side support surface is a separate surface being distanced from and situated above the depressions. This type of insert seat is particularly suitable for the embodiment of the insert wherein the side surface comprises a countersunk intermediate portion extending between the upper and lower positive clearance surfaces, wherein each of the plurality of protrusions being interposed between the upper and lower positive clearance surfaces to only extend along the countersunk intermediate portion of the side surface.

According to one embodiment, the plurality of depressions and the seat side support surface are arranged on a common rim, such that the seat side support surface forms an upper surface in which the plurality of depressions mouth. This type of insert seat is particularly suitable for the embodiment of the insert comprising upper and lower positive clearance surfaces intersecting at a median plane to form a waist of the cutting insert, wherein each of the plurality of protrusions extend between the upper and lower positive clearance surfaces over the waist.

The milling tool may be a right hand cutter or a left hand cutter. The milling tool may further comprise any suitable coupling or adaptor means for attaching the milling tool to a spindle of the machine tool, wherein such coupling/adaptor means are arranged on the opposite end of the milling tool as compared to the end on which the cutting inserts are arranged.

With regards to the orientation of the cutting inserts on the tool body, the cutting inserts are typically mounted at negative axial and radial rake angles such that the planes defined by the respective round cutting edges extend at negative angle with respect to the axis of rotation and the radius of the milling tool. The negative axial and radial rake angles may vary depending on for instance the insert size, the size on the positive clearance angle and the diameter of the milling tool. However, in general angles may belong to the range −5° to −10° on the negative axial rake angle and −10° to −20° on the negative radial rake angle.

The number of cutting inserts provided as well as the diameter of the tool body depends on the milling application. For example, the diameter of the cutting tool may typically range from a diameter of 25 mm to a diameter of 160 mm.

Further objectives, advantages and features of the cutting tool conceivable within the scope of the second aspect of the invention are readily understood by the foregoing discussion referring to the first aspect of the invention.

According to a third aspect of the invention, a tool body adapted to removably receive a cutting insert according to any of the embodiments described in the foregoing is provided. The tool body comprising at least one insert seat adapted to receive the cutting insert, the at least one insert seat comprising a flat bottom support surface adapted to support the lower flat support surface of the cutting insert, and an insert seat side surface comprising a plurality of depressions, each depression being adapted to receive one of the plurality of protrusions extending along the side surface of the cutting insert, such that the lower flat support surface of the cutting insert is supported against the flat bottom support surface of the insert seat, while the protrusions on the cutting insert are supported against the depressions in the insert seat side surface, wherein each of the plurality of depressions comprises an inner surface extending such that a first radial seat distance from the center axis of the cutting insert to the inner surface in the median plane of the cutting insert is at least equal to or greater than a second radial seat distance from the center axis to the inner surface in parallel planes located closer to the upper or lower side of the cutting insert.

For example, according to one embodiment, each of the plurality of depressions of the insert seat in the tool body may comprise an inner surface extending in parallel or concavely in the direction of the axis of the cutting insert when mounted to the insert seat.

Objectives, advantages and features of the tool body conceivable within the scope of the third aspect of the invention are readily understood by the foregoing discussion referring to the first aspect of the invention.

Further objectives of, features of and advantages of aspects of the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The invention will be better understood through the following illustrative and non-limiting detailed description of preferred embodiments, with reference to the appended drawings, on which.

All figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
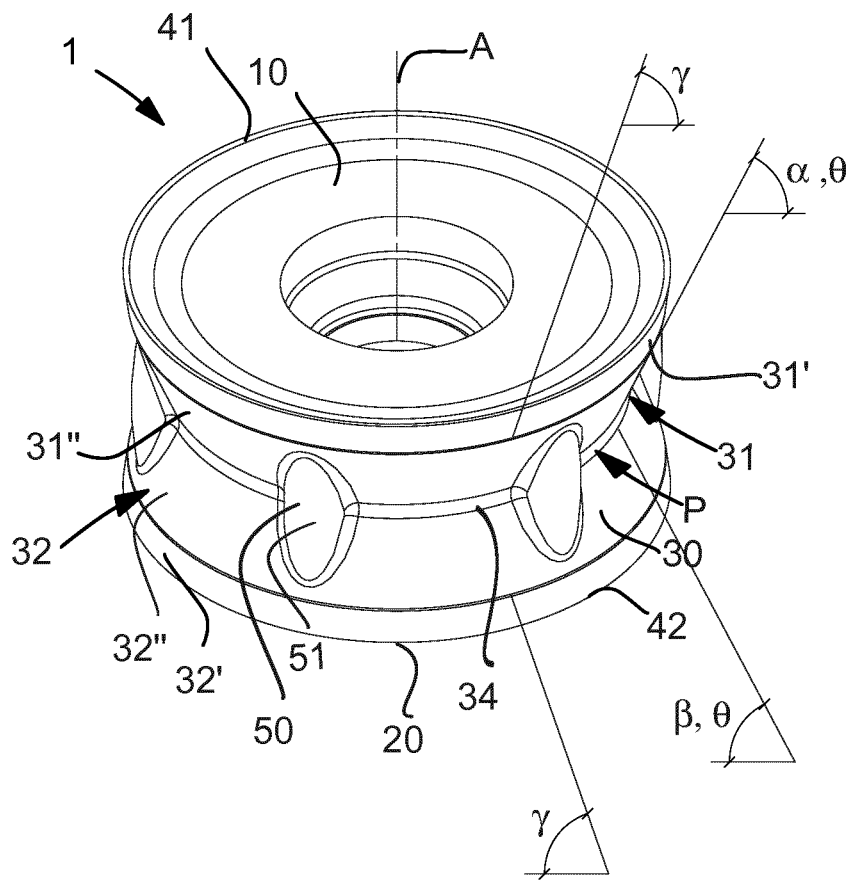
FIG. 1 is a perspective view of a cutting insert according to a first embodiment of the first aspect of the present invention.

An indexable and double-sided round cutting insert 1 for a milling tool according to a first exemplary embodiment is shown in FIG. 1. The insert 1 comprises an upper side 10 having an upper flat support surface and a lower side 20 having a lower flat support surface, the lower flat support surface is in the illustrated case parallel to the upper flat support surface. A center axis A of the round cutting insert 1 extends between the upper and lower side. Further, a through hole for clamping the insert to an insert seat of a cutting tool is provided.

A side surface 30 extends between the upper and lower side. In the illustrated embodiment, the side surface comprises an upper and a lower positive clearance surface 31, 32, a portion of each positive clearance surface 31, 32 respectively forms a first and second side support surface adapted to, when arranged on a milling tool, be supported against a corresponding surface of an insert seat of the milling tool for providing an axial and/or radial support to the cutting insert being mounted in the seat.

The insert 1 comprises a first and a second cutting edge, which may be referred to as an upper cutting edge 41 and a lower cutting edge. The upper cutting edge 41 is formed between the upper side 10 and the side surface 30, whereas the lower cutting edge 42 is formed between the lower side 20 and the side surface 30. 7. The upper and lower cutting edge 41, 44 is, respectively, situated further from a median plane P through the insert compared to the upper and lower flat support surface respectively, hereby providing a positive rake angle inside the cutting edge for smooth chip breaking.

With regards to the side surface 30, the side surface of the illustrated embodiment in FIG. 1 comprises an upper and a lower positive clearance surface 31, 32. These positive clearance surfaces 31, 32 are forming two joint frusto-conical structures, wherein the upper positive clearance surface 31 has a substantially frusto-conical extension at an upper positive clearance angle α with respect to a plane defined by the upper cutting edge 41 and the lower positive clearance surface 32 has a substantially frusto-conical extension at a lower positive clearance angle β with respect to a plane defined by the lower cutting edge 42. In the illustrated embodiment, the side surface 30 further comprises a waist 34 between the upper and lower positive clearance surfaces, wherein the waist 34 may form a radius transition between the upper and lower positive clearance surfaces.

In the illustrated embodiment of FIG. 1, the angles α and β as well as the height along the axis A of the upper and lower clearance surfaces are the same. That is, the design of the insert is symmetric, more particularly symmetric with respect to the median plane P.

One further feature of the illustrated cutting insert 1 is that both the upper and the lower clearance surface 31, 32 comprises a primary clearance surface 31', 32' and a secondary clearance surface 31", 32". The respective primary clearance surface 31', 32' is formed between the cutting edge 41, 42 and the respective secondary clearance surface 31", 32". The primary clearance surface 31', 32' forms a primary clearance angle γ with the plane of the cutting edge and said secondary clearance surface 31", 32" forms a secondary clearance angle θ, the secondary clearance angle θ being larger than the primary clearance angle γ. In the illustrated embodiment, the secondary clearance angle θ coincides, or is the same as, the upper and lower positive clearance angles α and β.

A plurality of protrusions 50, in the illustrated case six protrusions 50, each extending along the side surface between the upper and lower positive clearance surfaces 31, 32, over the waist 34, and protrude in a radial direction perpendicular to the center axis A. More particularly, each of the protrusions 50 extends between the secondary clearance surfaces 31", 32" of the upper and lower clearance surfaces 31, 32. Further, in the illustrated embodiment these secondary clearance surfaces 31", 32" respectively form the first and second side support surface mentioned above adapted to be supported against a corresponding surface of an insert seat. Accordingly, in the embodiment shown in FIG. 1, the protrusions 50 extend along the secondary clearance surfaces 31", 32" which in turn are adapted to form side support surfaces.

Further, each of the protrusions 50 comprises an outer surface 51 which extend axially in a convex manner. Hereby a relatively large height of the protrusion 51 at the median plane (i.e. at the waist 34) is achieved. Further, the outer surfaces 51 of the illustrated protrusions 50 each comprises a semi-circular shape, i.e. a cross section parallel to the plane defined by one of the cutting edges is semi-circular or at least describes a sector of a circle depending on the position of the cross section along the axis A.

Figure 2:
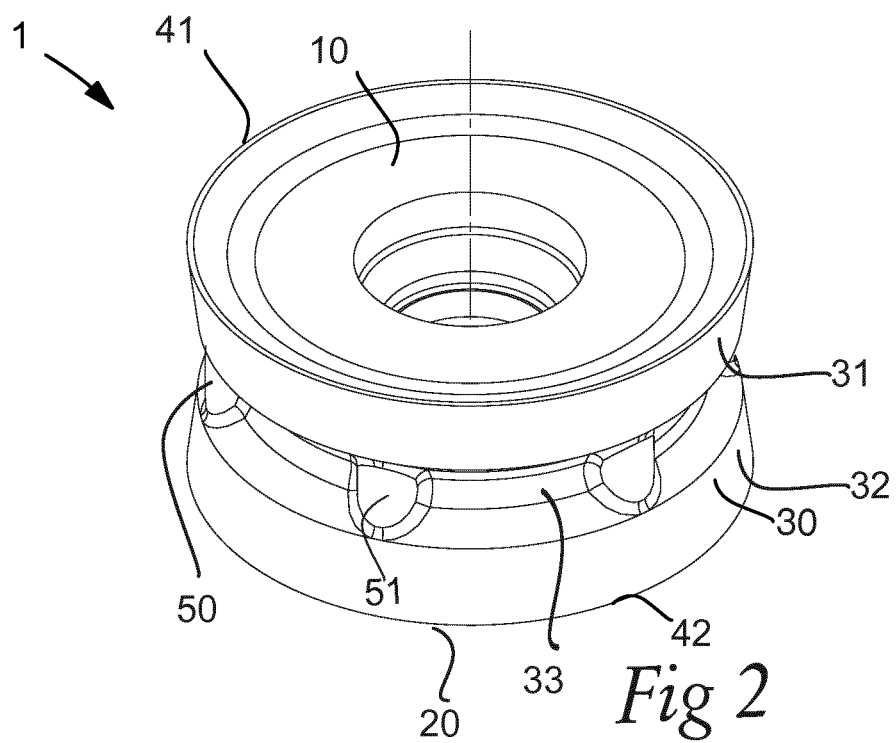
FIG. 2 is a perspective view of a cutting insert according to a second embodiment of the first aspect of the present invention.

FIG. 2 shows another embodiment of the indexable and double-sided round cutting insert 1 according to the present invention. Similarly to the embodiment of FIG. 1, the insert 1 comprises an upper side 10 having an upper flat support surface and a lower side 20 having a lower flat support surface and a center axis A of the round cutting insert 1 extending between the upper and lower side.

A side surface 30 extends between the upper and lower side. Also in this embodiment, a portion of the upper and lower positive clearance surface 31, 32 are forming a first and second side support surface 31, 32 to be supported against a corresponding surface of an insert seat of the milling tool. An upper cutting edge 41 and a lower cutting edge 42 are formed between the upper and lower sides 10, 20 and the side surface 30 respectively With regards to the side surface 30, the side surface of the illustrated embodiment in FIG. 2, the side surface 30 comprises a countersunk intermediate portion 33 extending between the upper and lower positive clearance surfaces 31, 32. These surfaces again have a respective, substantially frusto-conical extension at an upper and lower positive clearance angle α, β. This intermediate portion 33 is countersunk in relation to the upper and lower positive clearance surfaces 31, 32, such that a maximum diameter of the countersunk intermediate portion is smaller than a minimum diameter of the upper and lower positive clearance surfaces 31, 32. The design of the embodiment of FIG. 2 is symmetric in that the angles α and β as well as the height along the axis A of the upper and lower clearance surfaces is the same.

A plurality of protrusions 50, in the illustrated case six protrusions 50, each extending along the side surface between the upper and lower positive clearance surfaces 31, 32, over the intermediate portion 33, and protrude in a radial direction perpendicular to the center axis A and comprises an outer convex surface 51 which extend in parallel to the center axis A of the round cutting insert. More particularly, each of the plurality of protrusions 50 are in this embodiment interposed between the upper and lower positive clearance surfaces 31, 32 and extend only along the countersunk intermediate portion 33 of the side surface 30.

Consequently, since the clearance surfaces 31, 32 respectively form the first and second side support surface mentioned above adapted to be supported against a corresponding surface of an insert seat a design is achieved wherein the protrusion 50 are separated from (and somewhat countersunk) in relation to the side support surfaces.

Figure 3:
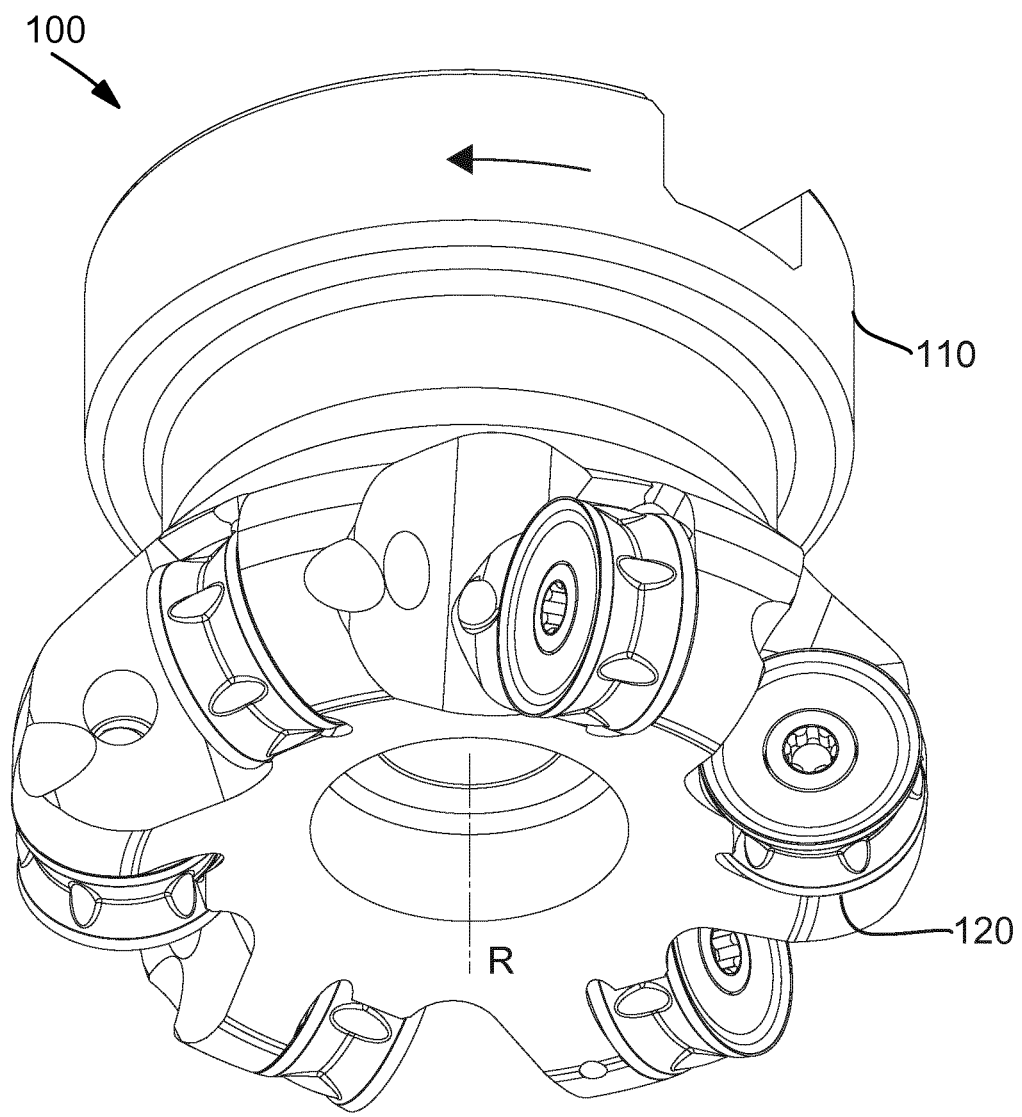
FIG. 3 is a perspective view of a cutting tool for milling according to a first embodiment of the second aspect of the present invention.

Turning to FIG. 3, a cutting tool 100 for milling according to a first embodiment of another aspect of the present invention is shown in a perspective view. The cutting tool 100 comprises a tool body 110 extending and rotatable about an axis of rotation R of the tool and a plurality of round indexable cutting inserts according to for example the embodiments described in the foregoing. In the illustrated embodiment, the tool comprises 6 cutting inserts arranged along the periphery of the tool in a respective insert seat 120 adapted to receive a cutting insert 100, the design of these seats 120 will be described in greater detail in the following.

Figure 4:
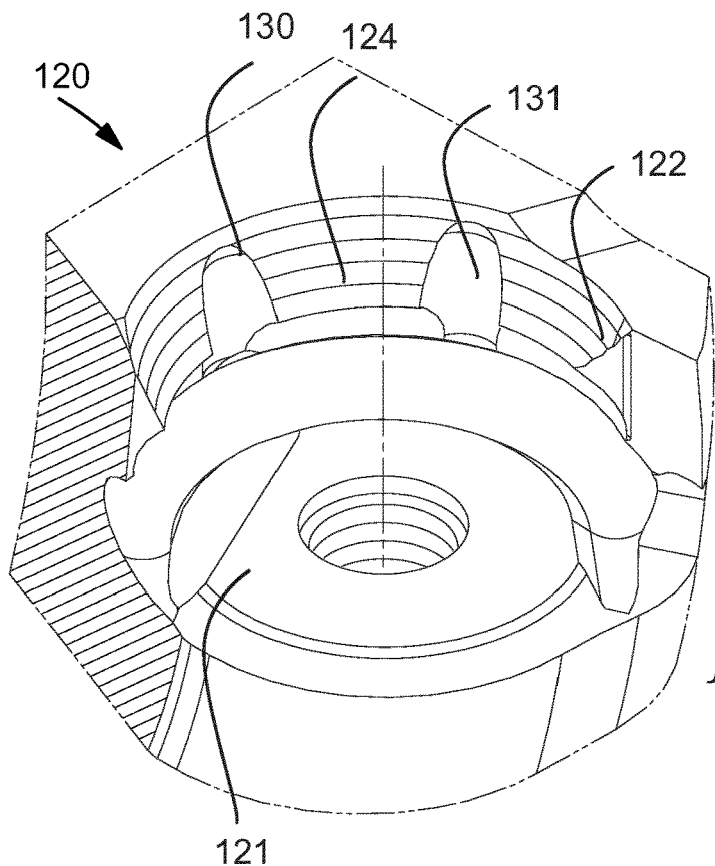
FIG. 4 is a detailed, perspective view of an insert seat of the first embodiment of the cutting tool.

FIG. 4 shows a first embodiment of an insert seat 120 in greater detail, the shown insert seat is suitable for, but not limited to use with, the cutting insert embodiment illustrated in FIG. 1. The seat 120 comprises a flat bottom support surface 121 adapted to support the upper or the lower flat support surface of the cutting insert received, and an insert seat side surface comprising a plurality of depressions 130. Each depression is adapted to receive one of the plurality of protrusions 50 extending along the side surface of the cutting insert. Further, each of the depressions 130 comprises an inner surface 131 extending in a concave manner in the direction of the axis A of the cutting insert when mounted to the insert seat. However, the inner surface 131 may extend in parallel to the axis A of the cutting insert in this embodiment.

The cutting inserts 100 of the tool are removably attached to the insert seat 120 as illustrated in FIG. 3. This such that the upper or lower flat support surface of the cutting insert is supported against the flat bottom support surface 121 of the insert seat 120, while the protrusions 50 on the cutting insert are received in the depressions 130 in the insert seat side surface. Due to the convex and concave extension of the surfaces 51 and 131 of the protrusion and the depression respectively provides for an increased surface contact there between.

Further, in the illustrated embodiment, these depressions 130 are evenly spaced at a first angle defining the distance between adjacent depressions 130 of the insert seat. As shown in FIG. 1, the protrusions 50 of the insert are also evenly spaced at a second angle defining the distance between adjacent protrusions 50 of the cutting insert. In the illustrated case, the second angle is equal to the first angle, but embodiments are equally conceivable where the angles differ. For example, the second angle may be at least twice as large as the first angle, whereby the insert seat in such an embodiment is formed with at least one intermediate depression 130 located between adjacent protrusions 50 when said cutting insert is mounted to the insert seat.

Further, the insert seat side surface comprises an insert seat side support surface 122 formed to support at least a portion of said upper (or lower positive clearance surface—when the double-sided insert is turned over) positive clearance surface 31 of the insert, in order to provide a stable axial and radial support to the insert. In the embodiment illustrated in FIG. 4, the plurality of depressions 130 and the seat side support surface 122 are arranged on a common rim 124, such that the seat side support surface 122 forms an upper surface in which the plurality of depressions 130 mouth. In other words, this seat side support surface 122 may be described as being arranged at a same distance from the bottom support surface 121 as the depressions 130, such that the depressions are formed in said seat side support surface 122.

Accordingly, the side support from the seat side support surface is provided at the same, i.e. an equal level or position along axis A as the depressions, which is suitable for example when an insert according to the embodiment of FIG. 1 is used, wherein the protrusions 50 extend over the waist 34 and the secondary clearance surfaces 31", 32" form side support surfaces for abutting the seat side support surface.

Figure 5:
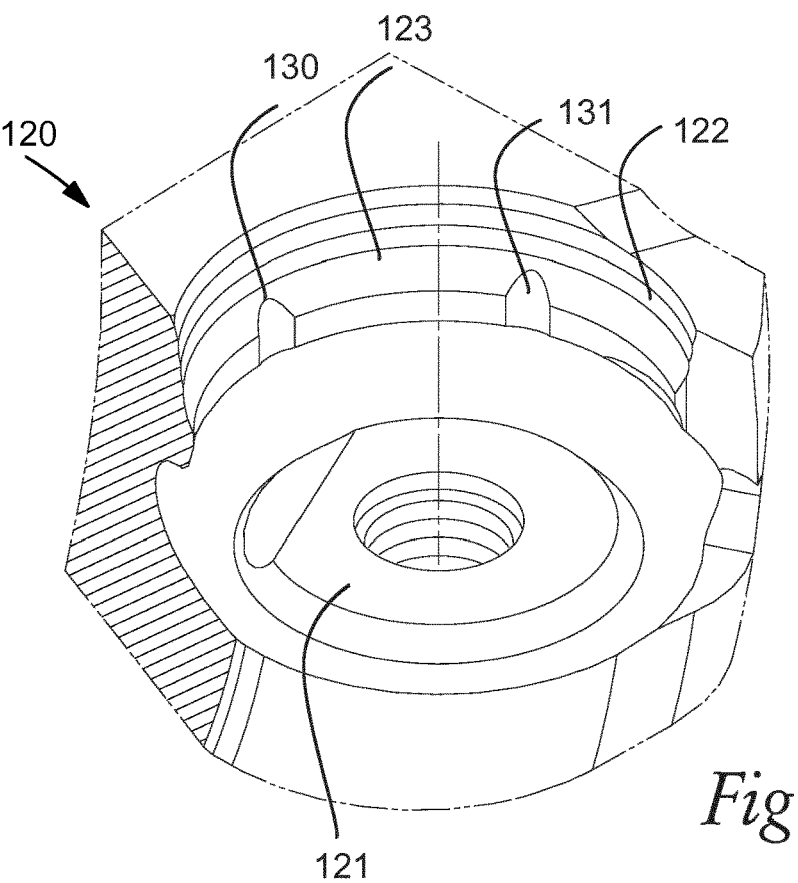
FIG. 5 is a detailed, perspective view of an insert seat of a second embodiment of the cutting tool.

FIG. 5 shows a second embodiment of an insert seat 120, this embodiment of the insert seat is suitable for, but not limited to use with, the cutting insert embodiment illustrated in FIG. 2. Similarly to the seat 120 shown in in FIG. 4, this seat 120 also comprises a flat bottom support surface 121 adapted to support the lower flat support surface (or upper flat support surface when the double-sided cutting insert is turned over) of the cutting insert received, and an insert seat side surface comprising a plurality of depressions 130 adapted to receive the protrusions 50 of the cutting insert. The depressions 130 are evenly spaced at a first angle, and the cutting inserts 100 are removably attached, i.e. mounted, to the insert seat 120 as described above.

Also in this embodiment the insert seat side surface comprises an insert seat side support surface 122 formed to support at least a portion of said upper (or lower) positive clearance surface 31 of the insert, in order to provide a stable axial/radial side support there between. In the embodiment illustrated in FIG. 5 however, the plurality of depressions 130 are provided on a rim 123, whereas the seat side support surface 122 is a separate seat side support surface 122 arranged at a larger distance from the bottom support surface (21) compared to the rim 123. In other words, this seat side support surface 122 is arranged at a distance above the plurality of depressions 130. Accordingly, the side support from the seat side support surface is provided above the depressions, and thereby adapted for an insert according to the embodiment of FIG. 2, wherein the protrusions 50 extend over the countersunk intermediate portion 33 between the clearance surfaces 31, 32, while side support is provided by means of the upper clearance surface 31 abutting the seat side support surface 122.

While the invention has been illustrated and described in detail in the drawings and foregoing description, such illustration and description are to be considered illustrative or exemplary and not restrictive; the invention is not limited to the disclosed embodiments. The skilled person understands that many modifications, variations and alterations are conceivable within the scope as defined in the appended claims.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. An indexable and double-sided round cutting insert for a milling tool, the cutting insert comprising:
    an upper side having an upper flat support surface;
    a lower side having a lower flat support surface;
    a center axis extending between said upper and lower side;
    a median plane extending perpendicular to said center axis and being situated halfway between the upper and lower side;
    a side surface extending between said upper and lower side, wherein an upper cutting edge is formed between said upper side and said side surface, and a lower cutting edge is formed between said lower side and said side surface, said side surface including an upper and a lower positive clearance surface such that said upper positive clearance surface has a substantially frusto-conical extension at an upper positive clearance angle with respect to said upper cutting edge and said lower positive clearance surface has a substantially frusto-conical extension at a lower positive clearance angle with respect to said lower cutting edge, wherein said upper and lower positive clearance surfaces intersect at the median plane to form a waist of said cutting insert, wherein each of said plurality of protrusions extend between said upper and lower positive clearance surfaces over said waist; and
    a plurality of protrusions extending along said side surface and protruding in a radial direction perpendicular to said center axis, wherein each of said plurality of protrusions has an outer surface, which in a direction along said center axis is extending such that a first radial distance from said center axis to said outer surface in the median plane of said insert is at least equal to or greater than a second radial distance from said center axis to said outer surface in parallel planes located closer to said upper or lower side of the round cutting insert, wherein each of the upper and lower clearance surfaces includes at least a primary clearance surface and a secondary clearance surface, wherein the primary clearance surface of the upper clearance surface is formed between the upper cutting edge and the secondary clearance surface of the upper clearance surface, which extends between the primary clearance surface of the upper clearance surface and the waist, wherein the primary clearance surface of the lower clearance surface is formed between the lower cutting edge and the secondary clearance surface of the lower clearance surface, which extends between the primary clearance surface of the lower clearance surface and the waist, and wherein each of said plurality of protrusions extend between the secondary clearance surfaces of the upper and lower clearance surfaces, said primary clearance surface forming a primary clearance angle and said secondary clearance surface forming a secondary clearance angle, the secondary clearance angle being larger than the primary clearance angle.

2. The cutting insert according to claim 1, wherein each of said outer surfaces of said plurality of protrusions extends parallel to said center axis.

3. The cutting insert according to claim 1, wherein each of said outer surfaces of said plurality of protrusions extends along said center axis in a convex manner.

4. The cutting insert according to claim 1, wherein said outer surface in a cross-section of each of said plurality of protrusions has a convex shape.

5. The cutting insert according to claim 1, wherein said side surface has an intermediate portion extending between said upper and lower positive clearance surfaces, the intermediate portion being countersunk in relation to the upper and lower positive clearance surfaces, such that a maximum diameter of said countersunk intermediate portion is smaller than a minimum diameter of said upper and lower positive clearance surfaces, each of said plurality of protrusions being interposed between said upper and lower positive clearance surfaces to only extend along said countersunk intermediate portion of said side surface.

6. The cutting insert according to claim 1, wherein said upper and lower cutting edge, respectively, is situated further from the median plane through the insert compared to said upper and lower flat support surface respectively.

7. A cutting tool configured for milling, said cutting tool comprising:
    a tool body being rotatable around an axis of rotation; and
    a cutting insert according to claim 1, the tool body including at least one insert seat arranged to receive the cutting insert, said at least one insert seat including a flat bottom support surface arranged to support said upper or said lower support surface of said cutting insert, and an insert seat side surface comprising a plurality of depressions, each depression being adapted to receive one of said plurality of protrusions extending along said side surface of said cutting insert, the cutting insert being removably attached to said insert seat such that said upper or said lower flat support surface of the cutting insert is supported against said flat bottom support surface of the insert seat, while the plurality of protrusions on the cutting insert are received in the depressions in the insert seat side surface.

8. The cutting tool according to claim 7, wherein each of said plurality of depressions comprises an inner surface extending such that a first radial seat distance from said center axis of said cutting insert when mounted to said insert seat to said inner surface located in the median plane of said insert is at least equal to or greater than a second radial seat distance from said center axis to said inner surface in parallel planes located closer to said upper or lower side of said cutting insert.

9. The cutting tool according to claim 7, wherein each of said plurality of depressions includes an inner surface extending in parallel to a direction of said axis of said cutting insert when mounted to said insert seat or an inner surface of each depression extending in a concave manner along said center axis of said cutting insert when mounted to said insert seat.

10. The cutting tool according to claim 7, wherein the depressions are evenly spaced at a first angle defining a distance between adjacent depressions of said insert seat and the protrusions are evenly spaced at a second angle defining a distance between adjacent protrusions of said cutting insert, the second angle being a multiple of the first angle, whereby the insert seat is formed with at least one intermediate depression located between adjacent protrusions when said cutting insert is mounted to the insert seat.

11. The cutting tool according to claim 7, wherein the depressions are evenly spaced at a first angle defining a distance between adjacent depressions of said insert seat and the protrusions are evenly spaced at a second angle defining a distance between adjacent protrusions of said cutting insert, the second angle being equal to the first angle.

12. The cutting tool according to claim 7, wherein said insert seat side surface includes an insert seat side support surface arranged to support at least a portion of said upper positive clearance surface of said insert.

13. The cutting tool according to claim 12, wherein said plurality of depressions are provided on a rim and wherein said seat side support surface is a separate seat side support surface arranged at a larger distance from said bottom support surface compared to said rim.

14. The cutting tool according to claim 12, wherein said plurality of depressions and said seat side support surface are arranged on a common rim, such that said seat side support surface forms an upper surface in which said plurality of depressions mouth.

15. A tool body arranged to removably receive a cutting insert according to claim 1, the tool body comprising:
    at least one insert seat arranged to receive the cutting insert, said at least one insert seat including a flat bottom support surface arranged to support the lower flat support surface of said cutting insert, and an insert seat side surface including a plurality of depressions, each depression being arranged to receive one of said plurality of protrusions extending along said side surface of said cutting insert, such that said lower flat support surface of the cutting insert is supported against said flat bottom support surface of the insert seat, while the protrusions on the cutting insert are received in the depressions in the insert seat side surface, wherein each of said plurality of depressions includes an inner surface extending such that a first radial seat distance from the center axis of the cutting insert to the inner surface in the median plane of the cutting insert is at least equal to or greater than a second radial seat distance from the center axis to the inner surface in parallel planes located closer to the upper or lower side of the cutting insert.

* * * * *